(12) United States Patent
Colmenares

(10) Patent No.: US 8,204,711 B2
(45) Date of Patent: Jun. 19, 2012

(54) SYSTEM AND APPARATUS FOR MANAGING TEST PROCEDURES WITHIN A HARDWARE-IN-THE-LOOP SIMULATION SYSTEM

(75) Inventor: Luis A. Colmenares, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 542 days.

(21) Appl. No.: 12/411,129

(22) Filed: Mar. 25, 2009

(65) Prior Publication Data

US 2010/0250220 A1 Sep. 30, 2010

(51) Int. Cl.
  *G01R 35/00* (2006.01)
  *G01R 31/00* (2006.01)
  *G01P 21/00* (2006.01)
  *G06F 19/00* (2011.01)
  *G06F 11/30* (2006.01)
  *G21C 17/00* (2006.01)

(52) U.S. Cl. ........ 702/123; 702/108; 702/119; 702/182; 702/183

(58) Field of Classification Search .................. 702/108, 702/119, 123, 182, 183
  See application file for complete search history.

(56) References Cited

U.S. PATENT DOCUMENTS

| | | | | |
|---|---|---|---|---|
| 6,598,002 | B1 * | 7/2003 | Claverie | 702/68 |
| 6,816,814 | B2 * | 11/2004 | Ebert et al. | 702/182 |
| 7,546,560 | B2 * | 6/2009 | Dirks et al. | 716/135 |
| 2004/0230970 | A1 * | 11/2004 | Janzen | 717/174 |
| 2007/0118319 | A1 * | 5/2007 | Pillin et al. | 702/108 |
| 2009/0019311 | A1 * | 1/2009 | Cahon et al. | 714/27 |

* cited by examiner

*Primary Examiner* — Janet Suglo
(74) *Attorney, Agent, or Firm* — Ingrassia Fisher & Lorenz P.C.

(57) ABSTRACT

Methods and apparatus are provided for managing test procedures for a hardware-in-the-loop (HIL) simulation environment. The apparatus comprises an input interface for receiving input from a user, a first processor coupled to the input interface and in operable communication with the HIL simulation environment. The first processor is configured to generate a test sequence comprising a plurality of test procedure references based on input from the user, wherein each test procedure reference corresponds to a test procedure that comprises instructions for issuing commands to, and receiving data from, the HIL simulation environment, and sequentially execute each referenced test procedure within the generated test sequence in cooperation with the HIL simulation environment, in response to a command from the user.

18 Claims, 3 Drawing Sheets

SYSTEM AND APPARATUS FOR MANAGING TEST PROCEDURES WITHIN A HARDWARE-IN-THE-LOOP SIMULATION SYSTEM

TECHNICAL FIELD

The present invention generally relates to automated testing, and more particularly relates to a system and apparatus for managing test procedures within a hardware-in-the-loop (HIL) simulation system.

BACKGROUND OF THE INVENTION

Hardware-in-the-loop (HIL) simulation systems offer an effective and cost efficient mechanism for testing complex electronic systems, such as a vehicular electronic control unit (ECU). Typically, an HIL simulation system includes and HIL simulator that that is coupled to, and configured to simulate the operating environment of, the electronic system under test. For example, a vehicular ECU may be coupled to an HIL simulator that is configured to simulate the other control units, sensors, and systems within a vehicle. This configuration allows the ECU to operate in substantially the same manner as it would operate within an actual vehicle. Accordingly, the HIL simulation system enables a user to test the ECU without the added complexity and cost associated with maintaining an actual vehicle.

Generally, the HIL simulator is controlled by a user via a host electronic device. The host electronic device provides an HIL interface that the user may utilize to provide commands to, and receive data from, the HIL simulator. This HIL interface enables the user to determine if the electronic system under test is operating properly by issuing commands to the HIL simulator and determining if a desired response occurs.

However, given the complexity of many electronic systems, including many vehicular ECUs, a user may be required to provide a large number of precisely timed commands via the HIL interface in order to comprehensively test the electronic system. Manually issuing such large numbers of precisely timed commands may be very time consuming for the user and costly for an employer. Further, there is an increased risk of user error during the testing process, which can lead to inaccurate test results.

Accordingly, it is desirable to provide a system for generating and managing large numbers of commands within an HIL simulation system. In addition, it is also desirable to provide a system for automatically issuing a plurality of commands within an HIL simulation system. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment an apparatus is provided for managing test procedures for an HIL simulation environment. The apparatus comprises an input interface for receiving input from a user, a processor coupled to the input interface and in operable communication with the HIL simulation environment. The processor is configured to generate a test sequence comprising a plurality of test procedure references based on input from the user, wherein in each test procedure reference corresponds to a test procedure having instructions for issuing commands to, and receiving data from, the HIL simulation environment, and sequentially execute each test procedure within the generated test sequence in cooperation with the HIL simulation environment, in response to a command from the user.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
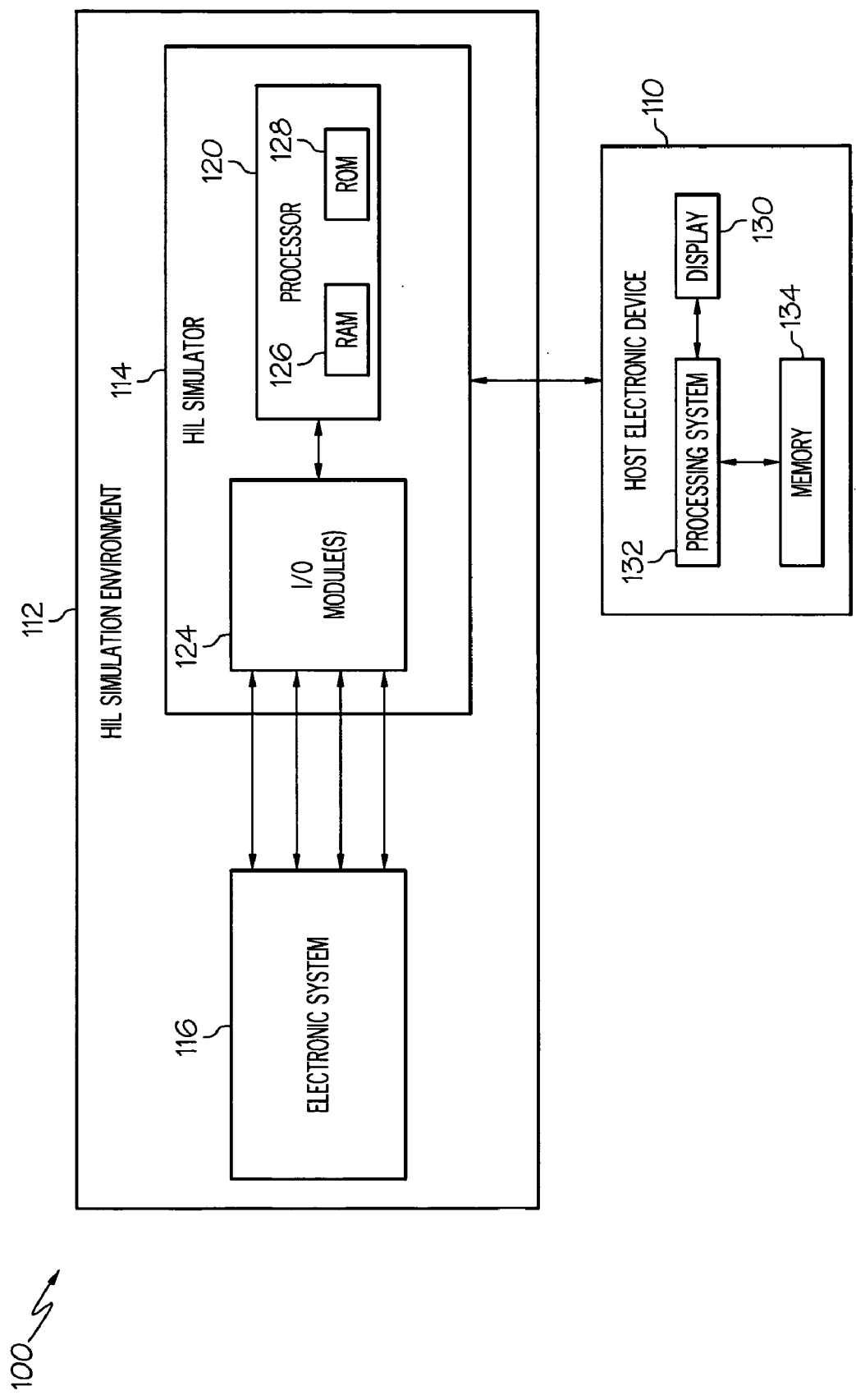
FIG. 1 is a block diagram of an exemplary hardware-in-the-loop simulation system.

FIG. 1 is a block diagram of an exemplary HIL simulation system 100. As depicted, system 100 includes a host electronic device 110 that is in operable communication with an HIL simulation environment 112. HIL simulation environment 112 includes an HIL simulator 114 and an electronic system 116 under test. Electronic system 116 includes one or more hardware and/or embedded software components that will be tested within system 100. In one embodiment, electronic system 116 comprises a vehicular ECU, such as a body control module or power train control module. However, it will be understood by one who is skilled in the art that electronic system 116 may be any electronic system that can be tested within a simulated environment.

HIL simulator 114 is in operable communication with host electronic device 110 with electronic system 116. As depicted, HIL simulator 114 includes a processor 120 and one or more I/O modules 124. Processor 120 is configured to execute a software simulation (a "plant model") of the operating environment for electronic system 116. The plant model may include environment variables and mathematical simulations of the dynamic systems (e.g. controllers, actuators, sensors, and/or other systems) found within the actual operating environment for electronic system 116. For example, in the case where electronic system 116 comprises a vehicular ECU, HIL simulator 114 may be configured to execute a plant model that simulates the various control units, sensors, and other systems that are found within an actual vehicle. Processor 120 is coupled to electronic system 116 via I/O module(s) 124. I/O module(s) 124 include various connectors and signal conditioners that enable processor 120 to transmit signals to, and receive signals from, electronic system 116. Ideally, the plant model and the I/O module(s) 124 allow processor 120 to substantially replicate the operating environment of electronic system 116, enabling electronic system 116 to operate within the HIL simulation environment 112 in substantially the same manner as it would within the its actual operating environment.

In addition, processor 120 is configured to receive predetermined commands from the host electronic device 110. These predetermined commands may include commands to reboot the HIL simulator 114, load/reload a plant model, start/pause/stop the plant model, assign values to one or more environment variables within the plant model, and/or retrieve operational and diagnostic data from electronic system 116 or a simulated system within the plant model.

Processor 120 may include one or more microprocessors, each of which may be any one of numerous known general-purpose microprocessors or application specific processors that operate in response to program instructions. In the depicted embodiment, processor 120 includes on-board RAM (random access memory) 126 and on-board ROM (read only memory) 128. The program instructions that control processor 120 may be stored in RAM 126, ROM 128, or a non-illustrated hard-drive. It will be appreciated that processor 120 may be implemented using various other circuits, not just one or more programmable processors. For example, digital logic circuits and analog signal processing circuits could also be used.

Host electronic device 110, as noted above, is in operable communication with HIL simulator 114. In one embodiment, host electronic device 110 is coupled to HIL simulator 114 via a real-time communication interface, such as FireWire. As discussed in detail below, host electronic device 110 is configured to provide commands to, and receive data from, the HIL simulator 114. In addition, host electronic device enables a user to manage and perform a plurality of test procedures for testing the operation of electronic system 116 within HIL simulation environment 112. Host electronic device 110 may comprise a desktop computer, a laptop computer, and/or any other computing device having a configuration sufficient to perform the operations described herein. In the depicted embodiment, host electronic device 110 includes a display device 130, a processing unit 132, and memory 134.

Figure 2:
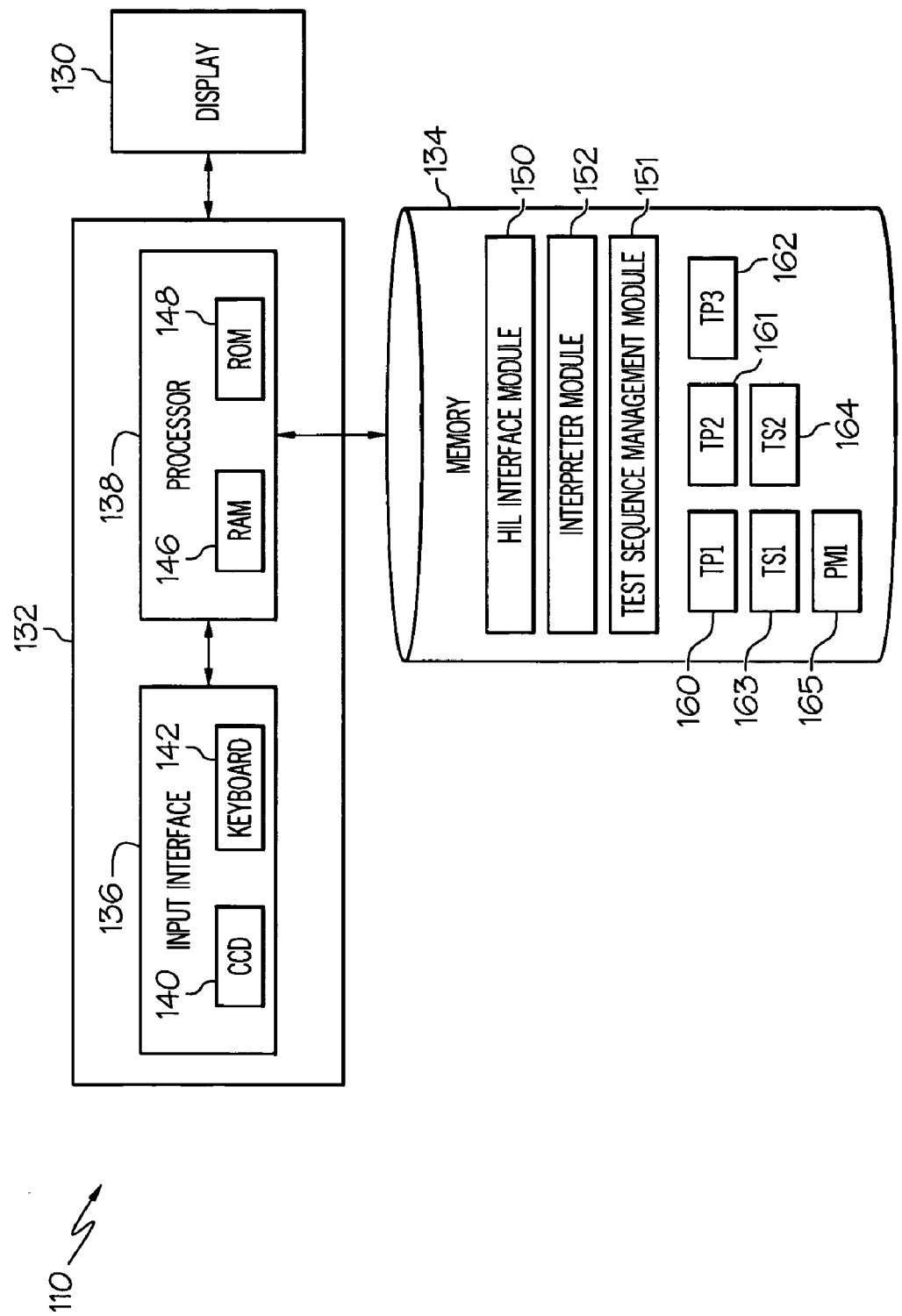
FIG. 2 is a block diagram of the host electronic device of FIG. 1.

FIG. 2 is a block diagram of the host electronic device 110 of FIG. 1. As described above, host electronic device 110 includes display device 130, processing system 132, and memory 134. Display device 130 is in operable communication with the processing system 132 and, in response to display commands received therefrom, displays various images. It will be appreciated that display device 130 may be any one of numerous known displays suitable for rendering graphic, iconic, and/or textual images in a format viewable by a user. Non-limiting examples of such displays include various cathode ray tube (CRT) displays, flat panel displays such as, for example, liquid crystal displays (LCD) and thin film transistor (TFT) displays, or displays based on any other known technology.

Processing system 132, at least in the depicted embodiment, includes an input interface 136 and a processor 138. Input interface 136 is in operable communication with processor 138 and is configured to receive input from the user and, in response to the user input, supply various signals to processor 138. Input interface 136 may be any one, or a combination, of various known user interface devices including, but not limited to, a cursor control device (CCD), such as a mouse, a trackball, or joystick, and/or a keyboard, one or more buttons, switches, or knobs. In the depicted embodiment, input interface 136 includes a CCD 140 and a keyboard 142. A user may utilize CCD 140 to, among other things, move a cursor symbol over, and select, various items rendered on the display device 130, and may utilize keyboard 142 to, among other things, input various data.

Processor 138 is in operable communication with display device 130, memory 134, and input interface 136 via one or more non-illustrated cables and/or busses. Processor 138 is configured to respond to user input supplied via input interface 136 to, among other things, selectively retrieve data from memory 134, and to command display device 130 to render various graphical, icon, and/or textual images.

Processor 138 may include one or more microprocessors, each of which may be any one of numerous known general-purpose microprocessors or application specific processors that operate in response to program instructions. In the depicted embodiment, processor 138 includes on-board RAM (random access memory) 146 and on-board ROM (read only memory) 148. The program instructions that control processor 138 may be stored in RAM 146, ROM 148, and/or memory 134. It will be appreciated that this is merely exemplary of one scheme for storing program instructions, and that various other storage schemes may be implemented. It will also be appreciated that processor 138 may be implemented using various other circuits, not just one or more programmable processors. For example, digital logic circuits and analog signal processing circuits could also be used.

Memory 134, as noted above, is in operable communication with processor 138 and is configured to store various data. These data may include one or more software modules, including an HIL interface module 150, a test sequence management module 151, and an interpreter module 152. In addition, memory 134 may store additional data including one or more test procedures 160, 161, 162, test sequences 163, 164, and plant models 165. Software modules 150-152 and data 160-165 will be described in detail below. It will be appreciated that the memory 134 may be implemented using numerous suitable devices for receiving and storing the various data. Some non-limiting examples include static memory, magnetic disks, hard drives, floppy drives, thumb drives, compact disks, and the like. In addition, the data may be stored on separate memory devices or in separate sections of a common memory device. Moreover, the memory 134 may be disposed within the same structural casing as the processing system 132 and/or display device 130, or it may be disposed separately therefrom. Finally, it will additionally be appreciated that the processor 138 and memory 134 may be in operable communication via a local wired or wireless local area network connection or via a wide area network connection.

No matter the specific manner in which the display device 130, the processing system 132, and memory 134 are implemented and in operable communication, the processing system 132 is configured, generally in response to one or more user inputs to the user interface 136, to retrieve one or more software modules (e.g., software modules 150-152) from the memory 134 and to execute each retrieved software module to perform the processes described below.

A description of each of the processes associated with software modules 150-152 will now be provided. It should be noted that certain ones of these software modules (e.g., HIL interface module 150 and interpreter module 152) may be provided by one or more third-party software applications. In addition, although the depicted embodiment includes three separate software modules, it should be understood that embodiments of the present invention may include various numbers and arrangements of software modules to perform the processes described below.

With reference to FIGS. 1 and 2, HIL interface module 150 includes program instructions that cause processor 138 to provide a communication interface between host electronic device 110 and HIL simulation environment 112. A user of host electronic device 110 or another software module may utilize HIL interface module 150 to transmit commands and data to, and retrieve diagnostic and operational data from, HIL simulator 114. In one embodiment, HIL interface module 150 enables the user or other software module to transmit a selected plant model 165 to HIL simulator 114. As described above, the plant model 165 is a software simulation of the operating environment for electronic system 116 and may include a plurality of environment variables and simulated dynamic systems. In addition, the user or other software module may issue commands that instruct HIL simulator 114 to reboot, load/reload plant model 165, start/pause/stop a simulation, assign a value to a selected environment variable, and/or retrieve diagnostic and operating data from the plant model and the electronic system 116.

Test sequence management module 151 includes program instructions that cause processor 138 to execute a plurality of test sequence management processes. The test sequence management processes include test sequence generation/editing, test sequence analysis, test sequence performance, and test results reporting. As described below with regard to FIG. 3, in one embodiment test sequence management module 151 includes program instructions that cause processor 138 to render a graphical user interface (GUI) on display device 130. The user may interact with this GUI via input interface 136 to perform these test sequence management processes. In addition, it should be noted that while test sequence management module 151 is depicted as a single software module, it may be implemented as a plurality of separate software modules that cooperatively perform the test management processes described below.

During test sequence generation/editing a user of host electronic device 110 generates and/or edits a plurality of test sequences. A test sequence includes a sequential list having one or more test procedure references and/or one or more test commands. A test procedure reference identifies a location in memory 134 where a test procedure (e.g., test procedure 160-162) is stored. These test procedures are customized software component having instructions for performing at least one test of the operation of electronic system 116 within HIL simulation environment 112. As further described below, the test procedure instructions may be written in a scripting language that is parsed and executed by interpreter module 152.

In general, test procedures include instructions for creating one or more desired operating conditions within HIL simulation environment 112 and determining if one or more desired responses occur. Accordingly, a test procedure includes instructions for issuing commands to HIL simulator 114 via HIL interface module 150 and instructions for retrieving operational and diagnostic data from HIL simulator 114 via HIL interface module 150. In addition, a test procedure also includes instructions for generating a test procedure log. The test procedure log includes data describing the execution of a test procedure, such as the test procedure start time, the commands issued to HIL simulator 114, the operational and diagnostic data retrieved from HIL simulator 114, the results (e.g., pass/fail) of each test performed during execution of the test procedure, and the test procedure end time.

A test command identifies a predetermined operation that is performed before, after, or between the referenced test procedures within a test sequence. As further described below, test commands may be used to ensure that HIL simulation environment 112 is in a stable state before a test procedure is executed. For example, a test command may assign default values to all of the environment variables for plant model 165, cause HIL simulator 114 to reload plant model 165, or cause HIL simulator 114 to reboot. Additional examples of test commands will be provided below.

During test sequence generation/editing the user is able to add test procedure references and/or test commands to a test sequence, delete test procedure references and/or test commands from a test sequence, and change the order of the test procedure references and test commands within a test sequence. The generated/edited test sequences may be stored in memory (e.g., test sequences 163, 164) to be retrieved at a later time. Thus, this process enables the user to generate a large sequence of commands that can be executed within the HIL simulation environment 112 to test the operation of electronic system 116 with minimal input from a user.

During test sequence analysis, a test sequence is analyzed to determine a count of the test procedure references and test commands, to validate the test procedure references, and to estimate its total execution time. The results of each analysis are provided to the user via a graphical or textual report that is rendered on display device 130. In one embodiment, test sequence management module 151 generates a count of the test procedure references and test commands within the test sequence by traversing the sequential list and counting each item included therein. In addition, test sequence management module 151 may validate the test procedures within a test sequence by traversing the sequential list and verifying that each test procedure reference corresponds to an actual test procedure (e.g., test procedures 160-162) stored in memory 134.

Test sequence management module 151 estimates the total execution time for a test sequence based on the number and types of test commands included therein and an individual execution time for each referenced test procedure. For example, each individual test command may be associated with an individual execution time (e.g., in seconds) enabling test sequence management module 151 to generate a cumulative execution time for all of the test commands within the test sequence. Further, each referenced test procedure may be associated with a predetermined execution time (e.g., in seconds). In one embodiment, this predetermined execution time is identified within the test procedure. In this case, test sequence management module 151 determines the individual execution time for each referenced test procedure based on its predetermined execution time and an execution overhead time. The execution overhead time is based on the time required for processor 138 to retrieve the test procedure (e.g., test procedures 160-162) and other data from memory 134 in order to begin executing the test procedure instructions. Finally, test sequence management module 151 generates the total execution time for the test sequence by adding the cumulative performance time for the test commands to the individual execution times for each referenced test procedure.

During test sequence performance, the test commands and referenced test procedures within a test sequence are sequentially executed by processor 138. Display device 130 may render a graphical or textual representation of the test sequence progress, including an elapsed time for each completed test procedure and test command and an elapsed time for the current test procedure or test command. In addition, at any time during the test sequence performance a user may request a stop test sequence command to terminate the performance of a test sequence (e.g., after execution of the current test procedure or test command has completed). Thus, this process enables the user to automate the execution of a large sequence of commands within the HIL simulation environment 112 to test the operation of electronic system 116.

As noted above, a test procedure is a customized software component that includes instructions for performing at least one test of the operation of electronic system 116 within HIL simulation environment 112. These test procedure instructions may be written in a scripting language, such as Python, Perl, PHP, TCL, or any other suitable scripting language. Further, interpreter module 152 may comprise a software interpreter (e.g., a Python interpreter, a Perl interpreter, a PHP interpreter, a TCL interpreter, etc.) having program instructions that enable processor 138 to retrieve a test procedure (e.g., test procedures 160-162) from memory 134 and execute the test procedure instructions. In this case, test sequence management module 151 executes each referenced test procedure in cooperation with interpreter module 152.

For example, each time test sequence management module 151 encounters a test procedure reference, test sequence management module 151 may submit the test procedure reference to interpreter module 152. Interpreter module 152 retrieves the corresponding test procedure from memory 134 and executes the test procedure instructions. As described above, the test procedure instructions will cause interpreter module 152 to transmit commands to, and receive diagnostic and operating data from, HIL simulation environment 112 via HIL interface module 150 and to maintain a test procedure log. In one embodiment, test sequence management module 151 monitors the test procedure log to detect one or more entries (e.g., such as a test procedure end time) signaling that interpreter module 152 has completed a submitted test procedure. Alternatively, test sequence management module 151 may communicate with interpreter module 152 to determine if the submitted test procedure is completed. Upon determining a submitted test procedure is completed, test sequence management module 151 executes the next item in the test sequence.

It should be noted that alternative embodiments may utilize other test procedure instruction formats. For example, the test procedure instructions may comprise program instructions that may be executed directly by processor 138. In this case, test sequence management module 151 would include program instructions that cause processor 138 to retrieve and execute each referenced test procedure, without the need for interpreter module 152.

As noted above, a test command identifies a predetermined operation that is performed before, after, or between the referenced test procedures within a test sequence. Test commands may be used to ensure that HIL simulation environment 112 is in a stable condition (e.g., an initialized state) before the execution of a referenced test procedure and/or to provide information to a user of host electronic device 110. Test commands that can be included within a test sequence include a reload plant model command, a reboot HIL simulator command, a clear environment variables command, a wait command, and a prompt command, to name a few. The operations associated with each of these commands will now be described.

A reload plant model command causes the HIL simulator 114 to reload the current plant model. In one embodiment, test sequence management module 151 provides a predetermined scripting language instruction to interpreter module 152 upon encountering a reload plant mode command. In response to this scripting language instruction, interpreter module 152 issues a command to HIL interface 114 via HIL interface module 150 causing HIL interface 114 to clear memory 126 and then reload and re-initialize the current plant model 165.

A reboot HIL simulator command causes the HIL simulator 114 to reboot. In one embodiment, test sequence management module 151 provides a predetermined scripting language instruction to interpreter module 152 upon encountering a reboot HIL simulator command. In response to this scripting language instruction, interpreter module 152 issues a command to HIL interface 114 via HIL interface module 150 causing HIL interface 114 clear memory 126 and reboot processor 120.

A clear environment variables command causes HIL simulator to assign predetermined default values to the environment variables for the current plant model 165. In one embodiment, a record of the environment variables and their corresponding default values for plant model 165 is stored in memory 134. In this case, test sequence management module 151 may be configured to issue scripting language instructions to interpreter module 152 based on the environment variables and corresponding default values in this stored record. In response to these scripting language instructions, interpreter module 152 issues commands to HIL interface 114 via HIL interface module 150 causing HIL interface 114 to assign the appropriate default value to each environment variable of plant model 165.

The wait command causes test sequence management module 151 to pause for a period of time that is substantially equal to a requested wait period. In one embodiment, the wait command includes the value of the wait period (e.g., in seconds). Further, the prompt command causes test sequence management module 151 to display a message to the user via display device 130. In one embodiment, the prompt command includes a timeout period (e.g., a value representing the length of a time period in seconds) and the message. In this case, test sequence management module 151 displays the message via display device 130 and pauses for a period of time that is substantially equal to the timeout period.

During test results reporting, one or more reports describing the performance of a test sequence are generated and displayed to the user. In one embodiment, test sequence management module 151 may store each test procedure log that is generated during performance of a test sequence in memory 134. The test procedure logs may be stored in a compressed format or in an uncompressed format. Further, test sequence management module 151 may convert each test procedure log into a format (e.g., an HTML document) that can be viewed and understood by a user via display device 130. Finally, test sequence management module 151 may generate a summary test sequence report based on the test procedure logs generated during a test sequence. The summary test procedure report may include an elapsed time for each executed test procedure and a summary of the results for each test (e.g., pass/fail) performed during execution of the test procedure. The summary test sequence report may be displayed via display device 130 in graphical or textual format and/or stored in memory 134.

Figure 3:
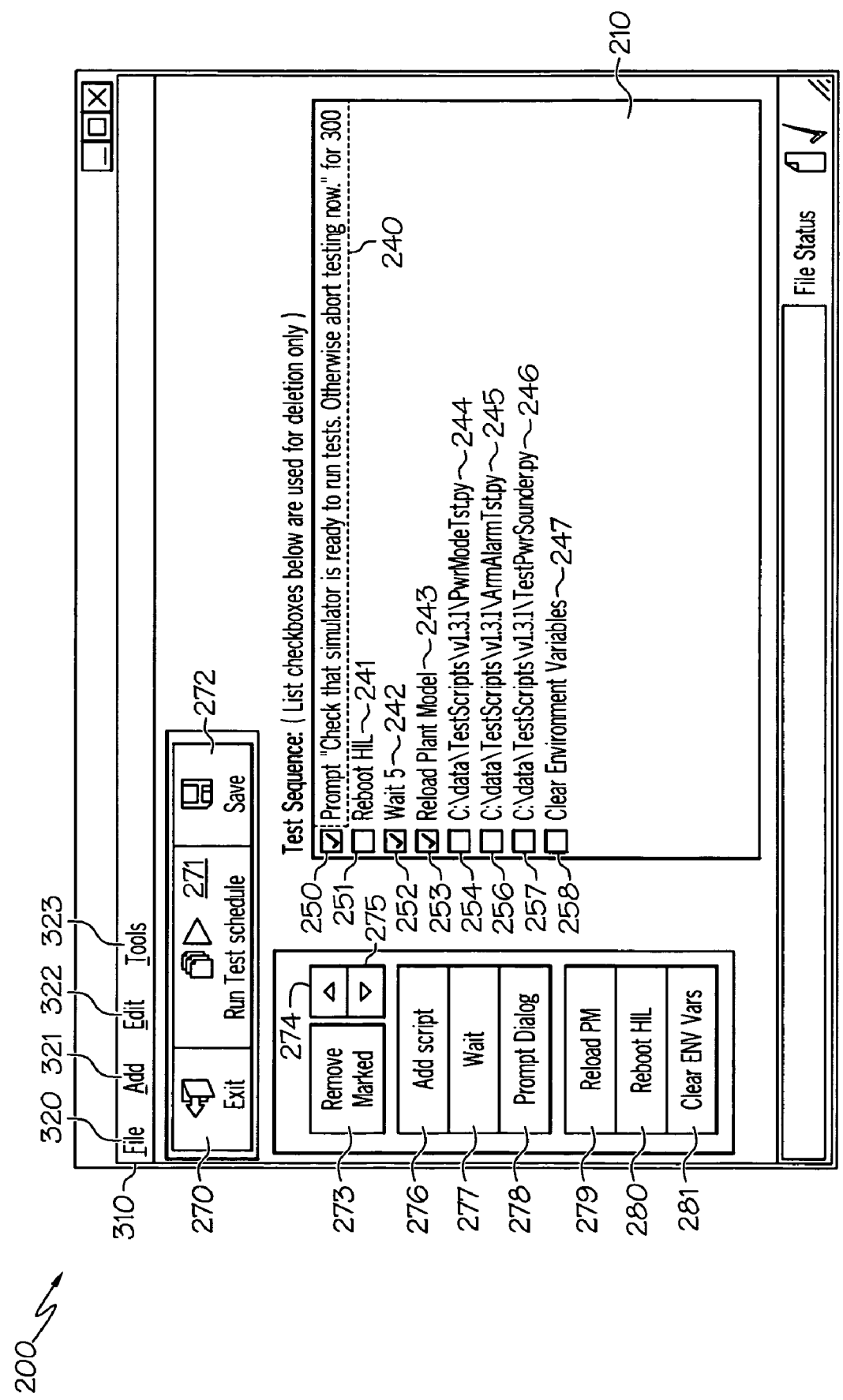
FIG. 3 is a depiction of an exemplary graphical user interface for managing a plurality of test sequences test sequences.

FIG. 3 is a depiction of an exemplary user interface 200 for managing a plurality of test sequences. With reference to FIGS. 2 and 3, user interface 200 is a GUI that is rendered on display device 130 in response to command signals received from processor 138 as it executes Test Sequence Management Module 151. User interface 200 includes a test sequence display area 210 configured to display items (e.g., test commands and test procedure references) within a displayed test sequence. As depicted, the displayed test procedure includes a prompt command 240, a reboot HIL simulator command 241, a wait command 242, a reload plant model command 243, a plurality of test procedure references 244, 245, 246, and a clear environment variables command 247. Each of these items 240-247 is associated with a check box 250, 251, 252, 253, 254, 255, 256, 257 that can be selected (e.g., check boxes 250, 252, and 253) or unselected (e.g., check boxes 251 and 254-257) by a user. In addition, the user may highlight an item 240-247 by utilizing CCD 140 to move a cursor symbol over and select the item.

User interface 200 also includes a plurality of selectable buttons, including an exit button 270, a perform test sequence button 271, a store test sequence button 272, a remove selected items button 273, a move item up button 274, a move item down button 275, an add test procedure reference button 276, a wait button 277, a prompt button 278, a reload plant model button 279, a reboot HIL simulator button 280, and a clear environment variables 281. The user selects exit button 270 to exit user interface 200 and the store test sequence button 272 to store the displayed test procedure in memory 134. In response to store test sequence button 272, processor 138 may cause display device 130 to render a graphical or textual interface that enables the user to select a location in memory 134 where the displayed test sequence will be stored. The remove selected items button 273 may be selected to remove items (e.g., items 240, 242, and 243) associated with selected check boxes from the test sequence. In addition, the move item up button 274 and move item down button 275 may be selected to relocate the highlighted item within test sequence display area 210, enabling the user to change the order of the commands and/or test procedures 240-247 in the test sequence.

Buttons 276-281 enable a user to insert items (e.g., test commands or test procedure references) within the displayed test sequence. In one embodiment, the new item is inserted after the currently highlighted item (e.g., prompt command 240) within the displayed test sequence. The user selects add test procedure reference button 276 to add a selected test procedure reference to the displayed test sequence. In response, to add test procedure reference button 276, processor 138 may cause display device 130 to render a graphical or textual interface that enables the user to select a desired test procedure reference. Further, the user selects the wait button 277 to insert a wait command within the displayed test procedure. In response to wait button 277, processor 138 causes display device 130 to render a graphical or textual interface that enables the user to select a wait period. Further still, the user selects the prompt button 278 to insert a prompt command within the displayed test sequence. In response to prompt button 278, processor 138 causes display device 130 to render a graphical or textual interface that enables the user to enter a message and a timeout period.

The reload plant model button 279, reboot HIL simulator button 280, and clean environment variables button 281 enable the user to respectively insert a reload plant model command, reboot HIL simulator command, or a clear environment variables command. In addition, the user selects display button 271 to cause processor 138 to perform the displayed test sequence. Processor 138 then accesses test sequence management module 151 to sequentially execute the test commands and reference test procedures within the displayed test sequence.

Finally, user interface 200 includes a menu bar 310 having a plurality of selectable menu categories. These selectable menu categories include a file menu category 320, an add menu category 321, an edit menu category 322, and a tools menu category 323. The user may select menu categories 320-323 to cause corresponding menus to be rendered on display device 130. Each menu includes a plurality of selectable menu items that the user may select to perform one of the test sequence management processes described above.

File menu category 320 corresponds to a menu that includes menu items which enable the user to retrieve an existing test sequence from memory 134, store the displayed test sequence, and view a test procedure log or a summary test sequence report. Further, add menu category 321 corresponds to a menu that includes menu items which enable the user to insert a test procedure reference and the test commands described above within the displayed test sequence.

In addition, edit menu category 322 corresponds to a menu that includes menu items which enable the user to select to select/unselect all of the checkboxes 250-258 within test sequence display area 210, remove items (e.g., items 240, 242, and 243) that are associated with a selected check box (e.g., check boxes 250, 252, and 253), and remove all of the items 240-147 from the displayed test sequence. Finally, tools menu category 323 corresponds to a menu that includes menu items which enable a user to perform the test sequence analysis processes described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An apparatus for managing test procedures for a hardware-in-the-loop (HIL) simulation environment, the apparatus comprising:
    an input interface for receiving input from a user; and
    a first processor coupled to the input interface and in operable communication with the HIL simulation environment, the first processor configured to:
    generate a test sequence comprising a plurality of test procedure references based on input from the user, wherein each test procedure reference corresponds to a test procedure that comprises instructions for issuing commands to, and receiving data from, the HIL simulation environment, and wherein each test sequence comprises instructions for creating a desired operating condition for the simulation environment using operational data and diagnostic data; and
    sequentially execute each referenced test procedure within the generated test sequence in cooperation with the HIL simulation environment, in response to a command from the user.

2. The apparatus of claim 1, wherein the first processor is further configured to:
    insert at least one test command within the generated test sequence based on input from the user, wherein each test command is associated with a predetermined operation; and
    sequentially execute each test command and each referenced test procedure within the test sequence in cooperation with the HIL simulation environment, in response to the command from the user.

3. The apparatus of claim 2, wherein the processor is further configured to store the test sequence to be retrieved at a later time.

4. The apparatus of claim 2, wherein:
    the at least one test command comprises a wait command that is associated with a wait period; and
    the first processor is further configured to pause for a period of time that is substantially equally to the wait period before executing the next test command or referenced test procedure in the test sequence in response to the wait command.

5. The apparatus of claim 2, further comprising a display device that is coupled to the processor and wherein:
    the at least one test command comprises a prompt command that is associated with a message and a timeout period; and the first processor is further configured to display the message to the user and to pause during a period of time that is substantially equal to the timeout period before proceeding to the next test command or referenced test procedure in the test sequence in response to the prompt command.

6. The apparatus of claim 2, wherein:
the HIL simulation environment includes an HIL simulator having a second processor configured to load and execute a plant model;
the at least one test command further comprises a reload plant model command; and
the first processor is further configured to cause the second processor to reload the plant model in response to the reload plant model command.

7. The apparatus of claim 2, wherein:
the HIL simulation environment includes an HIL simulator having a second processor configured to execute a plant model that includes a plurality of environment variables;
the at least one test command further comprises a clear environment variables command; and
the first processor is further configured to cause the second processor to assign default values to the plurality of environment variables in response to the clear environment variables command.

8. The apparatus of claim 2, wherein:
the HIL simulation environment includes an HIL simulator;
the at least one test command further comprises a reboot HIL simulator command; and
the first processor is further configured to cause the HIL simulator to reboot in response to the reboot HIL simulator command.

9. The apparatus of claim 2, wherein:
each referenced test procedure comprises instructions written in a scripting language; and
the first processor is further configured to access an interpreter software module to execute the instructions.

10. The apparatus of claim 2, wherein each referenced test procedure further comprises instructions for generating a test procedure log that includes describes the commands issued to, and the data received from, the HIL simulation environment during execution of the referenced test procedure.

11. The apparatus of claim 10, wherein the processor is further configured to compile a summary test sequence report describing the execution of each reference test procedure within the test sequence based on the test procedure log for each referenced test procedure.

12. The apparatus of claim 2, further comprising a display device coupled to the first processor and configured to display a user interface comprising:
a test sequence display area for displaying the at least one test command and the plurality of test procedure references within the test sequence;
a selectable add test procedure reference control for adding a test procedure reference to the test sequence;
a test command control for adding a test command to the test sequence; and
a selectable test sequence performance control for causing the first processor to sequentially execute the at least one test command and the plurality of referenced test procedures.

13. A non-transitory computer readable medium comprising instructions that, when executed by a processor that is in operable communication with a hardware-in-the-loop (HIL) simulation environment, cause the processor to perform the following steps:

generating a test sequence comprising a plurality of test procedure references and a plurality of test commands, wherein:
each test procedure reference corresponds to a test procedure comprising instructions for performing at least one test within the HIL simulation environment by issuing commands to, and receiving data from, the HIL simulation environment;
each test command is associated with a predetermined operation; and
each test sequence comprises instructions for creating a desired operating condition for the simulation environment using operational data and diagnostic data; and
sequentially executing each referenced test procedure and each command within the test sequence in cooperation with the HIL simulation environment.

14. The computer readable medium of claim 13, wherein each referenced test procedure further comprises instructions written in a scripting language and the step of sequentially executing includes accessing an interpreter software module to execute the instructions.

15. The computer readable medium of claim 13, wherein each referenced test procedure is further comprises instructions for generating a test procedure log comprising data describing the commands issued to the HIL simulation environment, the data received from the HIL simulation environment, and the results of the at least one test performed during the execution of the referenced test procedure.

16. The computer readable medium of claim 15, wherein the method further comprises generating a test sequence summary report describing the execution of each referenced test procedure within the test sequence based on the test procedure log for each referenced test procedure.

17. A system for automating the performance of a plurality of test procedures, the system comprising:
a hardware-in-the-loop (HIL) simulation environment that comprises an HIL simulator and an electronic system under test; and
a host electronic device in operable communication with the HIL simulation environment and comprising:
an input interface for receiving input from a user; and
a processor coupled to the input interface and configured to:
generate a test sequence comprising a plurality of test procedure references and test commands based on input from the user, wherein each test procedure reference corresponds to a test procedure comprising instructions for issuing commands to, and receiving data from, the HIL simulation environment and each test command is associated with a predetermined operation, and wherein each test sequence comprises instructions for creating a desired operating condition for the simulation environment using operational data and diagnostic data; and
sequentially execute each referenced test procedure and each test command within the test sequence in cooperation with the HIL simulation environment, upon receiving a command from the user.

18. The system of claim 17, wherein each test procedure further comprises instructions for generating a test procedure log that describes the commands issued to, and the data received from, the HIL simulation environment during execution of the referenced test procedure.

* * * * *